July 11, 1961
G. R. COOK
2,992,394
BALANCED PHASE SENSITIVE DETECTOR
Filed Sept. 3, 1959
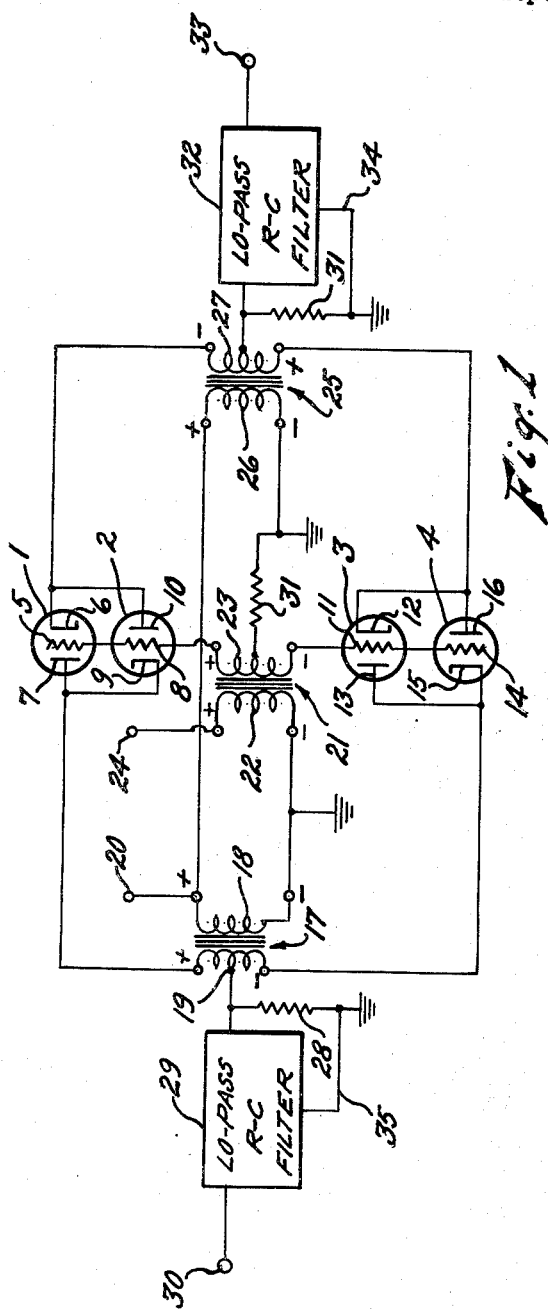
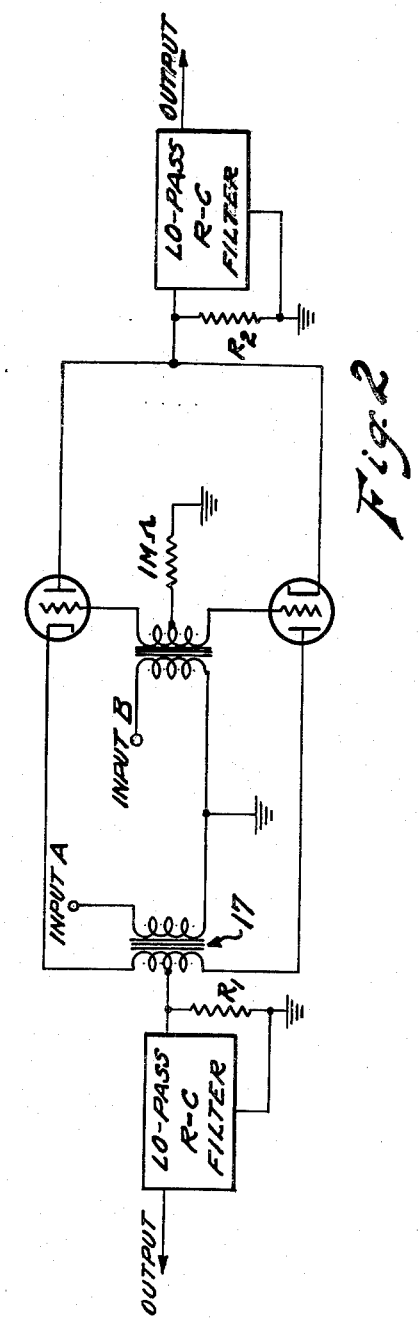
INVENTOR.
GEORGE R. COOK
BY
ATTORNEYS United States Patent Office 2,992,394
Patented July 11, 1961

2,992,394
BALANCED PHASE SENSITIVE DETECTOR
George R. Cook, Houston, Tex., assignor to the United States of America as represented by the Secretary of the Air Force
Filed Sept. 3, 1959, Ser. No. 838,007
3 Claims. (Cl. 328—133)

This invention relates to a phase detector and more particularly to a balanced phase sensitive detector wherein the relative phase difference of two input alternating current signals determines the magnitude and sign of each of the two output signals.

In accordance with the present invention a balanced phase sensitive detector is provided in which a pair of inputs are provided, one of the pair of inputs is hereinafter referred to as input A and the other as input B. The present invention rectifies an alternating voltage and provides a differential output such that the following characteristics are satisfied: output voltage versus input voltage (input A) is linear over a wide range; the phase relation between the voltage at input A and another voltage of the same frequency fed to input B determines the polarity of the output voltage; the change of magnitude of output voltage versus change of the phase angle between the pair of aforesaid inputs is minimized near 0° and 180°; the change of magnitude of output voltage versus change of magnitude of the voltage fed to input B is minimized over a large range; the output voltage is zero when a voltage is fed to only one of either of the two inputs; the sum of the voltages at the two terminals of the differential output (with respect to ground) approaches zero as nearly as possible under all operating conditions. The prior art does not provide a circuit which satisfies all of the aforegoing characteristics.

One of the features of the present invention is the arrangement of the circuit such that it is symmetrical about ground and about aforesaid input A. Another feature is the use of limiting at input B due to a voltage divider action. The utilization of the aforementioned features ensures that the phase relationship between two input voltages determines the polarity of the output voltage and that the change of magnitude of output voltage versus change of phase angle between the two input voltages is minimized near 0° and 180° and also that the change of magnitude of output voltage versus change of magnitude of the voltage fed to aforesaid input B is minimized over a large range.

An object of the present invention is to provide a novel phase sensitive detector in balanced relationship.

Another object of the present invention is to provide a balanced phase sensitive detector wherein the phase difference between two alternating current input voltages determines the magnitude and sign of each of two output voltages.

A further object of the present invention is to provide a balanced phase detector to rectify an input alternating voltage so that the output voltage is linear in relation thereto over a wide range.

A still further object of the present invention is to provide a balanced phase sensitive detector wherein the phase relation between two input voltages determines the polarity of the output voltage.

A still further object of the present invention is to provide a novel balanced phase sensitive detector receiving two alternating current input voltages and furnishing two direct current output voltages whose sum approaches zero as nearly as possible under all operating conditions.

The various features of novelty which characterize this invention are pointed out with particularity in the claims annexed to and forming part of the specification. For a better understanding of the invention, however, its advantages and specific objects obtained with its use, reference should be had to the accompanying drawings and descriptive matter in which is illustrated and described a preferred embodiment of the invention.

In the drawings:
FIGURE 1 is a circuit diagram of a preferred embodiment of the present invention, and
FIGURE 2 is another embodiment of the present invention.

Referring now to FIGURE 1 in greater detail, there is shown electron discharge devices 1 and 2 in which grid 5 is connected to grid 8 to form a first control element. Cathode 6 is connected to anode 10 to form a second control element and anode 7 is connected to cathode 9 to form a third control element. Electron discharge devices 3 and 4 are arranged so that grid 11 is connected to grid 14 to form a fourth control element. Anode 16 is connected to cathode 12 to form a fifth control element and anode 13 is connected to cathode 15 to form a sixth control element.

Transformer 17 has the upper end of its primary winding 18 connected to input terminal 20. Transformer 21 has the upper end of primary winding 22 connected to input terminal 24. The lower end of primary winding 18 is connected to ground and also to the lower end of primary winding 22. Center-tapped secondary winding 19 of transformer 17 has the upper end connected to anode 7 of electron discharge device 1, the lower end to cathode 15 of electron discharge device 4. The center-tap of secondary winding 19 of transformer 17 is connected to ground by way of resistor 28 and also to low pass R.C. filter 29. From filter 29 there is provided output terminal 30. Filter 29 is also connected to ground by way of line 35.

Center-tapped secondary winding of transformer 21 has the upper end thereof connected to grid 8 of electron discharge device 2, the lower end is connected to grid 11 of electron discharge device 3. The center-tap of secondary winding 23 is connected to ground by way of resistor 31.

The upper end of primary winding 26 of transformer 25 is also connected to input terminal 20, the lower end is connected to ground. Center-tapped secondary winding 27 has the upper end connected to cathode 6 of electron discharge device 1 and the lower end to anode 16 of electron discharge device 4. The center-tap of secondary winding 27 is connected to ground by way of resistor 31 and also to low-pass R.C. filter 32. Filter 32 provides a signal by way of output terminal 33. Filter 32 is also connected to ground by way of line 34.

Transformer 17 is arranged so that when an A.C. input voltage is impressed upon terminal 20, the aforesaid voltage will appear on the same phase on anode 7 of electron discharge device 1 and in the opposite phase on cathode 15 of electron discharge device 4. Simultaneously, transformer 25 is so arranged that the aforesaid A.C. input voltage will be impressed in the same phase on anode 16 of electron discharge device 4 and in the opposite phase on cathode 6 of electron discharge device 1.

An alternating current voltage is fed into terminal 20 and another is fed into terminal 24. When the phase relations of the two aforesaid voltages are such that the grid and plate voltages of electron discharge device 3 are in phase, then a positive voltage will be developed at output 33 and a negative voltage will be developed at output 30 due to the conduction through resistor 28 and 31 and electron discharge devices 1 and 3. When the phase between aforesaid two input voltages is changed slightly, magnitudes of the output voltage will be reduced slightly. When the phase of one of aforesaid input voltages is changed 90° from the initial condition, all the electron discharge devices will conduct equally, and the average voltage at both output terminals 30 and 33 will be zero. When the phase of either of aforesaid input voltages is changed 180° from the initial condition, electron discharge devices 2 and 4 only will conduct and the voltage developed at terminal 33 is negative and that at output 30 is positive. No output is produced if an input voltage is fed to terminal 20 only, due to the balanced arrangement of the circuit. If a voltage is fed to terminal 24 only, equal positive voltages are produced at outputs 30 and 33, however the undesired (in phase) output voltages will be small compared to the desired (differential) output voltages while maintaining good linearity. It is to be noted that the differential output voltage is developed across terminals 30 and 33.

Now referring to Figure 2, there is shown another embodiment of the present invention whose mode of operation is similar to the embodiment as illustrated in FIGURE 1 except that conduction occurs only every other half cycle and therefore operates as a half-wave unit.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described my invention, what I claim as new and desire to secure by Letters Patent is:

1. A balanced phase sensitive detector circuit comprising a first and second pair of electron discharge devices, each of said devices having grid, cathode and anode electrodes, said first pair of devices having commoned grid electrodes to form a first control element, one of said cathode electrodes connected to one of said anode electrodes to form a second control element and the other of said anode electrodes connected to the other of said cathode electrodes to form a third control element, said second pair of devices having commoned grid electrodes to form a fourth control element, one of said anode electrodes connected to one of said cathode electrodes to form a fifth control element, and the other of said anode electrodes connected to the other of said cathode electrodes to form a sixth control element, first means to impress a first alternating current input voltage upon said second and fifth control elements in push-pull relationship, second means to simultaneously impress upon said third and sixth control element said first voltage in a push-pull relationship, third means to impress a second alternating current input voltage upon said first and fourth control element in push-pull relationship, and means to develop a direct current output voltage by way of each said first and second push-pull means whose polarity and magnitude is determined by the relative phase difference of said first and second input voltages.

2. A balanced phase sensitive detector circuit as defined in claim 1 wherein each of said first, second and third means to impress voltage in push-pull relationship is comprised of a first, second, and third transformer respectively, each having a primary winding and a center-tapped secondary winding.

3. A balanced phase sensitive detector circuit as defined in claim 2 wherein said means to develop an output voltage is comprised of a first resistor connected to ground from the center-tap of said secondary winding of said first transformer, said center-tap simultaneously being connected to a first output terminal by way of a first low-pass filter, and a second resistor connected to ground from the center-tap of said secondary winding of said second transformer, said center-tap simultaneously being connected to a second output terminal by way of a second low-pass filter.

References Cited in the file of this patent

UNITED STATES PATENTS

| | | |
|---|---|---|
| 2,480,125 | Field | Aug. 30, 1949 |
| 2,579,001 | Jerrers | Dec. 18, 1951 |
| 2,677,054 | Cohen | Apr. 27, 1954 |

FOREIGN PATENTS

| | | |
|---|---|---|
| 146,789 | Australia | June 11, 1952 |